UNITED STATES PATENT OFFICE.

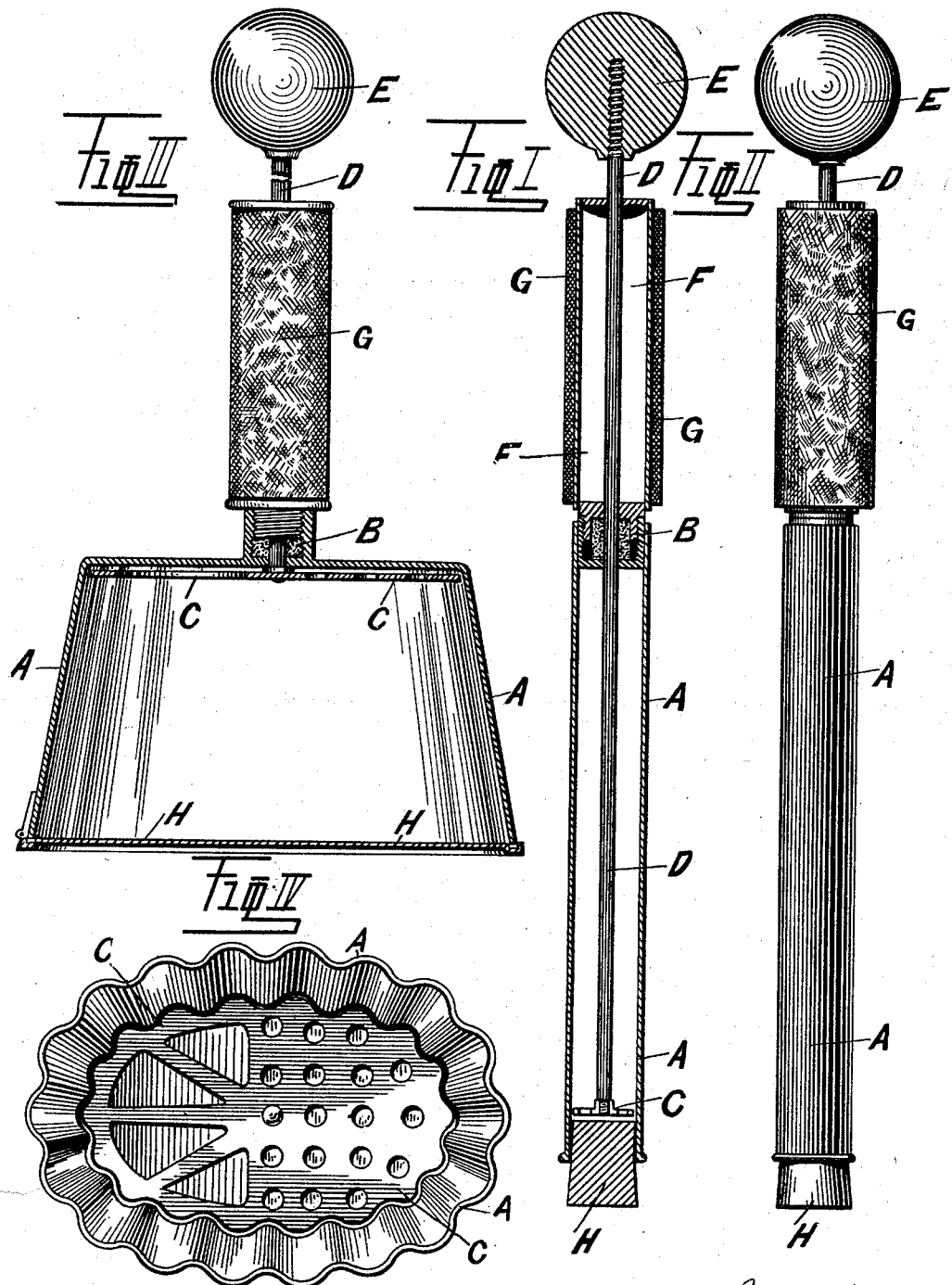

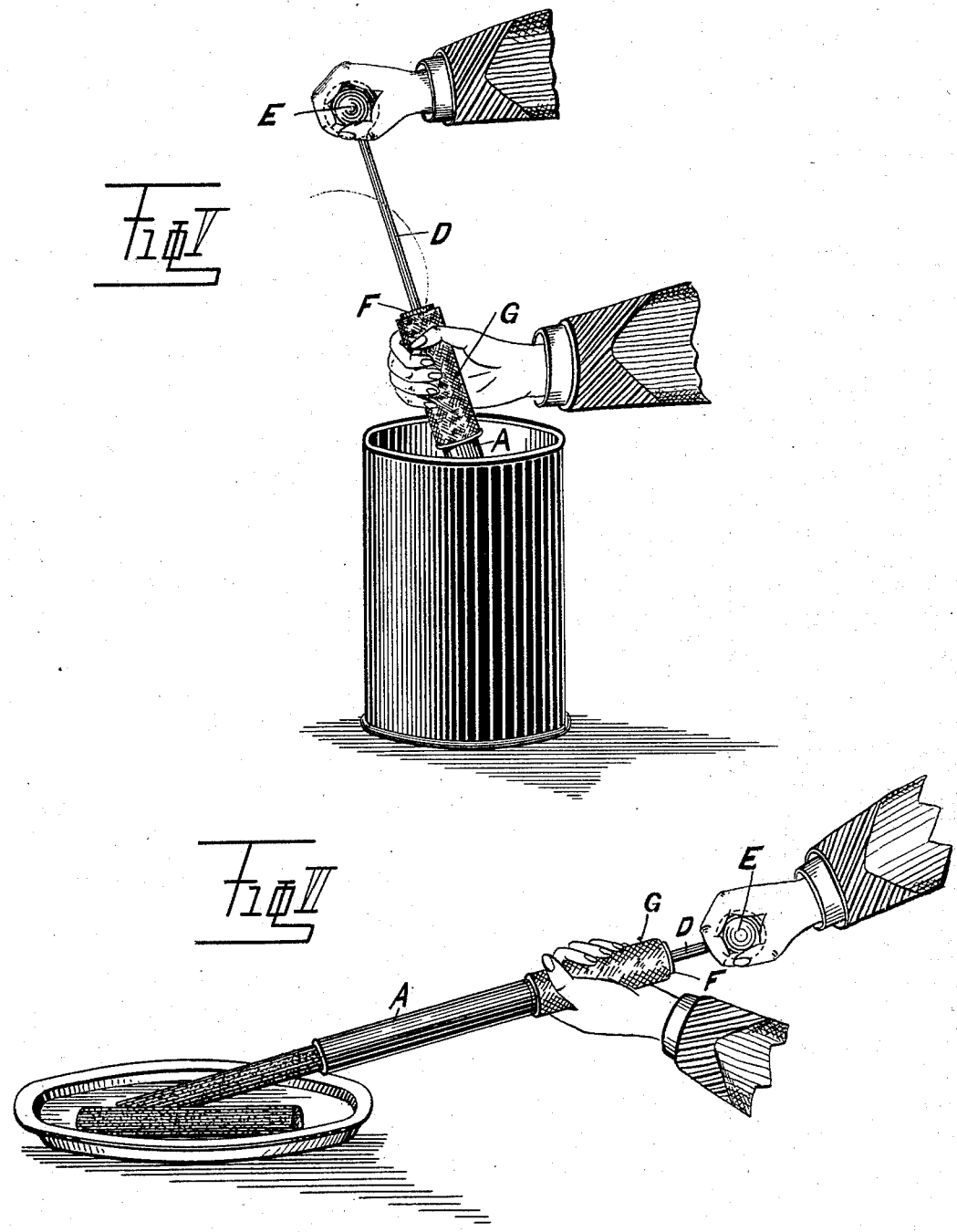

JAMES OSBORN SPONG, OF LONDON, ENGLAND.

ICE-CREAM FREEZER.

SPECIFICATION forming part of Letters Patent No. 505,731, dated September 26, 1893.

Application filed April 21, 1893. Serial No. 471,315. (No model.) Patented in England March 7, 1893, No. 4,984.

*To all whom it may concern:*

Be it known that I, JAMES OSBORN SPONG, a subject of the Queen of Great Britain, and a resident of 226 High Holborn, London, England, have invented a certain new and useful Improvement in Liquid Cooling and Congealing Apparatus, (patented in Great Britain, No. 4,984, dated March 7, 1893,) of which the following is a specification.

This invention has for its object to provide a novel, simple, efficient and economical apparatus in or by which edible and other ices can be expeditiously prepared in small quantities for table and also for medical purposes.

The apparatus consists of a tube of regular or irregular shape within which the cream, water or other media can be retained by a stopper or end cover for the insertion of the tube into a pail or other vessel containing a freezing mixture such as chemicals which are well known, or the ordinary salt and small pieces of broken ice can be used as the freezing mixture. The cream or other liquid or semi-liquid body is disturbed or churned by a loose fitting piston within the tube in order that the coldness of the mixture in the pail can be imparted to the substance as it becomes congealed said piston being used to expel the frozen substance after the stopper or end cover is removed.

It is well known that edible ices at present produced in hotels and at other public resorts as well as those prepared for families are mostly of such a character that the outer surface is more hard by crystallization than the interior and in consequence it has to be exposed for a time for the crystallization to disappear so that the congealed piece may be of uniform consistency and temperature and in the proper condition for consumption. By my invention sticks and other molded forms of edible ices can be rapidly made of uniform temperature and softness for immmediate use and made only at the time required for consumption.

The construction of apparatus will be clearly understood from the annexed drawings.

Figure I, is a section of a regular shaped tube; Fig. II, elevation of same. Fig. III section of mold for forming edible ices after the style of blanc-manges ready to be placed upon a table. Fig. IV, is an under side view of the mold showing the loose fitting piston with different shaped holes to enable it to pass through the substance being frozen and for insuring the coldness of the surrounding mixture being imparted to the contents of the mold. Fig. V, represents a vessel with one of my tubes within it and with the parts grasped by the hands of an operator during the freezing operation. Fig. VI, indicates the apparatus as removed from the vessel and the frozen contents being forced out of the tube by pressure on the plunger.

To enable my apparatus to be manipulated I have an elongation of the tube and cover it with felt, wood or other material as a hand hold, the knob on the piston rod serving for the other hand to move the piston up and down and also for forcing the frozen contents out of the tube.

The same letters of reference apply to all the figures.

A is the tube; B. stuffing box; C piston; D rod; E, knob thereon; F elongation or handle of tube A covered with felt, wood or other material G; H stopper or end cover.

To use my invention I after removing the stopper or cover H invert the tube A and fill it with say cream for making cream ice. The stopper H is placed in position and the tube A immersed in the freezing mixture. The plunger C after say, one minute is drawn up and down to agitate the cream while coagulating, the plunger being then drawn up and left in that condition for the cream to "set." The tube A when removed from the freezing mixture is dipped in water the metal of the tube being thereby raised in temperature to relieve the ice from the inner side of the tube ready, when the stopper is removed, for the plunger to push the stick or molded form of ice out on to a plate.

Where quantities of ices are required a number of tubes can be arranged in the same freezer pail and be filled and emptied in succession.

What I claim, and desire to secure by Letters Patent, is—

An apparatus for making ices, consisting of a vessel A having a removable and replaceable stopper H at one end, and a stuffing box B at the other end, an elongated handle portion F extending from the stuffing box, a loose fitting perforated piston C arranged in the vessel, and a piston rod D extending through the said handle portion and stuffing box and connected with the piston in the vessel, substantially as described.

Signed at 166 Fleet Street, London, England, this 30th day of March, 1893, in the presence of two witnesses.

JAMES OSBORN SPONG.

Witnesses:
 HENRY GARDNER,
 RICHARD CORE GARDNER,
*Both of* 166 *Fleet Street, London, England, Patent Agents.*